Sept. 11, 1945. W. C. TROENDLE 2,384,711
INFANT'S CARRIAGE
Filed Feb. 19, 1944 2 Sheets-Sheet 1

INVENTOR.
William C. Troendle
BY Charles R. Fay
atty.

Sept. 11, 1945.  W. C. TROENDLE  2,384,711
INFANT'S CARRIAGE
Filed Feb. 19, 1944  2 Sheets-Sheet 2

INVENTOR.
William C. Troendle
BY Charles R. Fay
atty.

Patented Sept. 11, 1945

2,384,711

UNITED STATES PATENT OFFICE 2,384,711

INFANT'S CARRIAGE

William C. Troendle, Gardner, Mass., assignor to Thayer Company, Gardner, Mass., a corporation of Massachusetts Application February 19, 1944, Serial No. 523,021

8 Claims. (Cl. 155—7)

This invention relates to improvements in baby carriages or the like.

Objects of the invention include the provision of a novel support to be used in a carriage whether of the rigid or folding type, said support being easily adjustable to provide for prone, reclining, and sitting positions for the infant, wherein the infant is enabled to look out from the sides of the hood of the carriage when in sitting position and also in reclining position; the provision of a support as aforesaid comprising a plurality of panels or pads which are movable longitudinally of the carriage as a unit, one panel or pad being provided with means permitting pivoting thereof to different degrees depending on the longitudinal position of the unit, said one panel or pad providing a back rest when pivoted out of alinement with the remaining panel or panels and being useful as a part of the support when in line therewith in prone position of the occupant; and the provision of a convertible support for an infant comprising a seat portion and a back rest portion, said portions being articulated and simultaneously slidable and relatively pivotable for effecting a plurality of positions for the infant, e. g., normal prone position, a reclining position, and a sitting up position, in the latter of which the infant is supported at his back and located so as to be able to see out of the sides of the carriage as distinct from the prior art wherein the infant is located far back under the hood when in sitting position, it therefore being difficult to see out of the carriage.

Other objects and advantages of the invention will appear hereinafter.

Reference is to be had to the accompanying drawings in which:

Fig. 6 is a plan view of the infant support.

Figure 1:
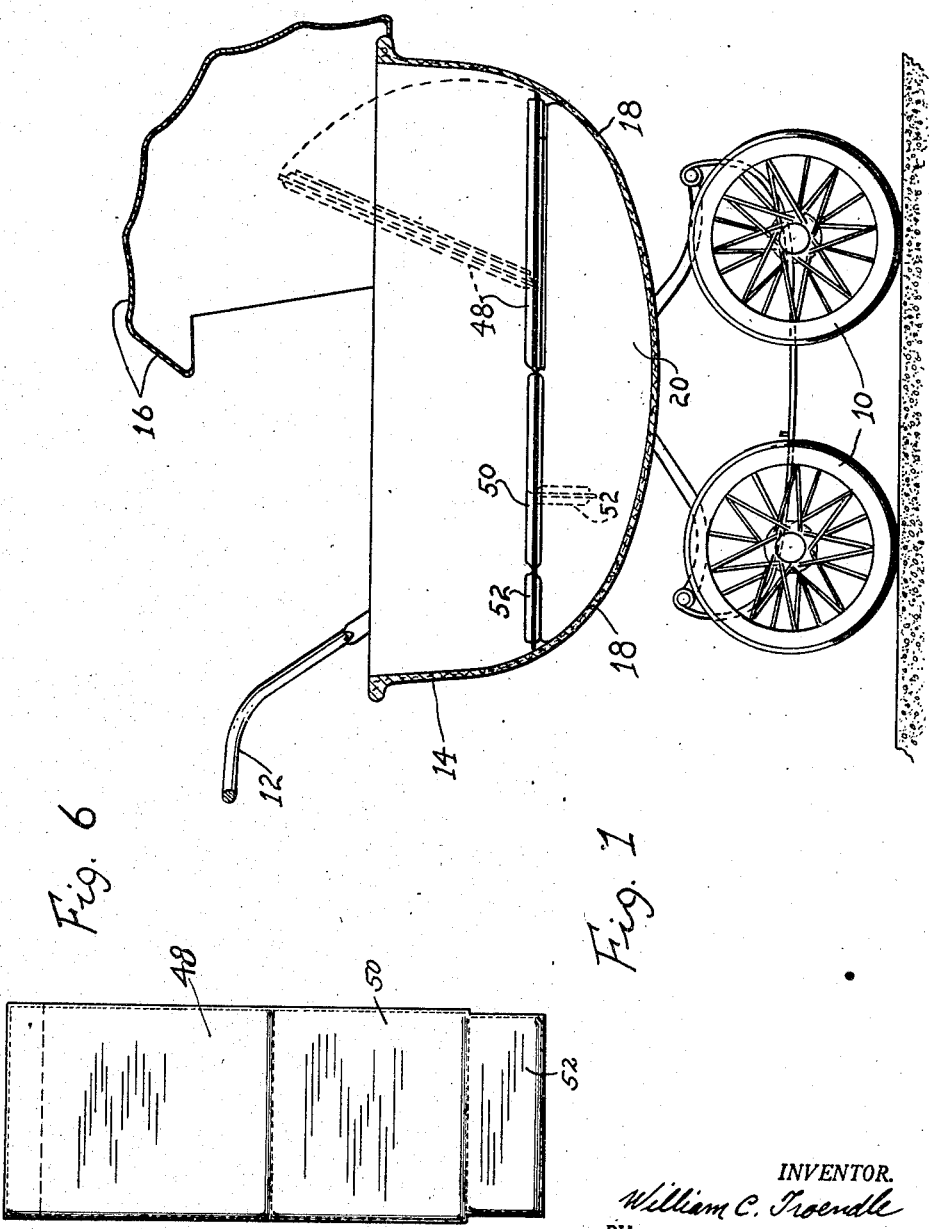
Fig. 1 is a longitudinal section through a carriage and showing an embodiment of the invention.

In Fig. 1 an infant's carriage is shown as having wheels 10, a pusher handle 12, a body 14, and a hood 16. The body 14 may be rigid, pliable, or folding, to collapse. The type of carriage is immaterial to the invention which resides solely in the infant support illustrated in, more particularly, Figs. 2—5 inclusive.

Most baby carriages have a boat-shaped bottom as seen at 18, and the present invention is illustrated showing this shape, but this is not to be considered as a limitation on the invention, it being well known in the art that carriages of the nature herein referred to may be flat in this region or any other desired or convenient conformation of bottom is permissible without departing from the scope of the invention.

A frame to be set into the carriage comprises a pair of legs 20 connected at their ends by cross rods 22, the legs in the present illustration being curved at their lower edges to fit the shape of the carriage, see 24. A box-like member 26 is located to depend between the legs at corresponding ends thereof, this member constituting a foot rest at the rear of the carriage as will be described. The frame comprising legs 20 and rods 22 is of a width to fit the carriage and rests on the bottom thereof, see Fig. 1, so that the infant will be well down below the tops of the carriage walls when prone, but on sitting up his head will be on line with or partly above the side walls.

On the interior aspect of each leg 20 there is provided a track 28 extending from the foot rest 26 towards the rod 22 opposite from the foot rest. These tracks are spaced from the legs 20 for most of their lengths by reason of bent ears 30 which are riveted or otherwise fastened to the legs as clearly shown in Fig. 5. Each track is supplied with a slot, these slots corresponding in shape and starting at a high point 32, extending down at 34 and leading into a blind recess 36, thence continuing on an upward incline 38 and terminating in another blind recess 40.

A panel or the like 42 is provided at one edge with a rod 44 the ends of which enter the slots for guidance therein. Links 46 are pivoted to an intermediate portion of the panel, and in turn these links are pivoted to the supporting frame, so that the panel 42 is attached to the frame but can move longitudinally thereof from the Fig. 2 upright position and finally to the Fig. 4 prone position, as limited by the slots.

Figure 2:
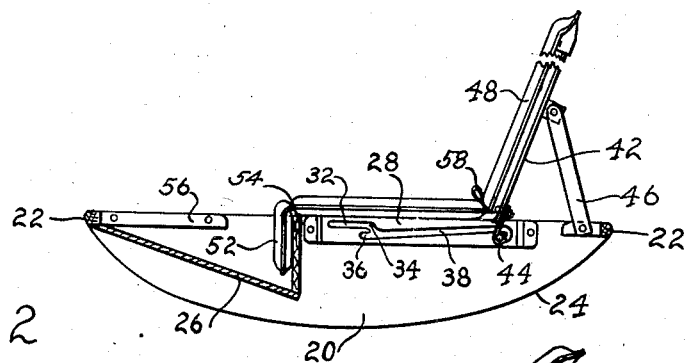
Fig. 2 is a detailed view of the invention showing the support in position for use in sitting up.
Figure 3:
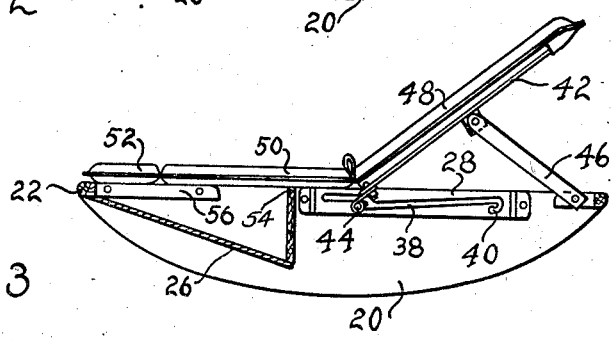
Fig. 3 is a view similar to Fig. 2 and showing the parts in reclining position.
Figure 4:
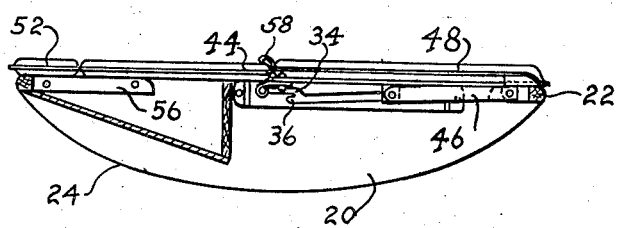
Fig. 4 is a view similar to Fig. 2 and showing the parts in prone position.
Figure 5:
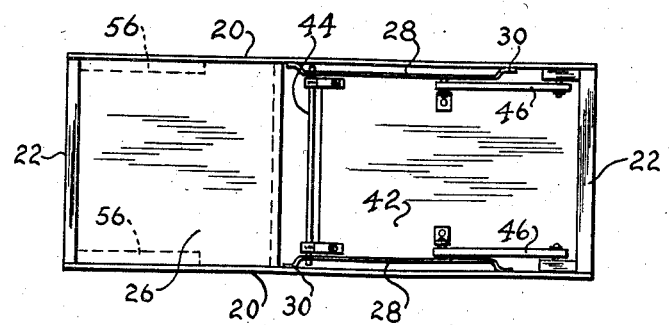
Fig. 5 is a bottom plan view of the parts of Fig. 4.

The panel 42 may be provided with a pad 48 which is articulated with another pad 50, also having a panel to stiffen it, the latter forming the seat in Figs. 2 and 3. A third pad 52, smaller than the others, is designed to cover the legs 20 in prone and reclining positions, and to depend into the footrest member in sitting position, so that support for the legs of the occupant is provided in Figs. 3 and 4 by the pad 52, but as seen in Fig. 1 this pad is allowed to drop and cushions the corner 54 occasioned by the foot rest member. Pad 52 may be slightly narrower than the other two pads or panels, and it is supported on a cross rod 22 in Figs. 2 and 3, as well as on a pair of supports 56, but it may be tucked down past the ends of these supports, see Fig. 2, whereas the panels and pads 42, 50 are still resting on legs 20.

A small tab 58 is provided to aid in manipulating the panels. If the parts are in the Fig. 4 position, it is merely necessary to grasp the end of pad 48 and retract the same, which action automatically results in pivoting the back rest upwardly and retracting pads 50 and 52. If the pad 48 is then released, with rod 44 along incline 38, the weight of the parts causes a reverse motion to seat the rod in recesses 36 and thereby latch the back rest in Fig. 3 position. The Fig. 2 position is achieved merely by an extension of the above named action to seat rod 44 in recesses 40, at which point the pad 52 assumes the position shown therefor in Fig. 2.

To return the panels and pads, the tab is grasped to release the rod from either recesses 40 or 36 and to aid in sliding the parts to their other positions.

It will be seen from the above that I provide a support which will rest the infant's head in position to see out of the carriage when the infant is reclining or sitting up and which also provides a foot rest and a flat comfortable prone mattress. The device is relatively simple yet provides for more comfort to the infant and in a satisfactory supporting unit for baby carriages without adding substantially to the cost.

Having thus described my invention and the advantages thereof, I do not wish to be limited to the details herein disclosed, otherwise than as set forth in the claims, but what I claim is:

1. In a carriage, a frame, a back rest and a seat pivoted together along adjacent edges and slidable as a unit on the frame, the back rest being slidably pivoted to the frame and the seat being free thereof, and latching catches in the frame to latch the back rest in angular positions relative to the seat, said back rest and seat being capable of alinement to present a flat support.

2. In a carriage of the class described, a frame, a plurality of panels on the frame adapted to lie thereon flatly to form a prone support, and one panel being pivoted relative to another panel to be angularly raised to form a back rest; means releasably holding the back rest in raised position, and means slidably and pivotally connecting an edge of said back rest panel to the frame adjacent the near edge of the next panel.

3. In a carriage of the class described, a frame, a seat and a back rest panel on the frame, said panels being articulated and capable of alinement for supporting a carriage occupant prone, and selectively interpivotable to provide a seat and back rest, means latching the back rest in at least two positions wherein it is pivoted relative to the frame and the seat panel, and a pivoted sliding connection to the frame between the back rest and seat panels, said seat panel being free of the frame and resting thereon for sliding movement with respect thereto.

4. In a carriage, a frame, a plurality of connected panels slidable on the frame, a track member on the frame, a slot in the track member, a latching recess in the slot, means on one panel entering the slot and guided thereby, a link connecting said one panel and the frame, the other panel being free of the frame but resting for sliding action thereon, said one panel acting as a back rest when said means enters the recess and latches the parts in position.

5. The device recited in claim 1 including a panel pivoted to the seat, means on the frame to support the panel in general alignment with the seat, and means in the frame selectively to receive the panel in angular relation to the seat.

6. The device recited in claim 1 including an element pivoted to the back rest and to the frame to cause pivoting of the back rest relative to the frame upon relative sliding motion therebetween.

7. The device recited in claim 1 including a panel pivoted to the seat, means located adjacent an end of the frame to support the panel thereat in aligned position with the seat, said means terminating at a point to provide for dependence of the panel within the frame in certain locations of the seat.

8. The device recited in claim 2 including a third panel pivoted to said next panel, said third panel being selectively disposable in aligned position relative to said next panel or at an angle thereto.

WILLIAM C. TROENDLE.